United States Patent [19]
Leon et al.

[11] Patent Number: 5,440,938
[45] Date of Patent: Aug. 15, 1995

[54] SYSTEM FOR DETERMINING SHAFT LOAD PARAMETERS INCLUDING SHAFT WINDUP ANGLE PER UNIT LENGTH, TORQUE OUTPUT AND POWER OUTPUT IN A GENERALLY CYLINDRICAL ROTATING SHAFT

[75] Inventors: Robert L. Leon, Maple Glen; Anthony L. Moffa, Phoenixville, both of Pa.

[73] Assignee: Liberty Technologies, Inc., Conshohocken, Pa.

[21] Appl. No.: 12,083

[22] Filed: Feb. 1, 1993

[51] Int. Cl.⁶ .............................................. G01L 3/02
[52] U.S. Cl. ................. 73/862.191; 73/116; 73/862.321
[58] Field of Search ............ 73/862.191, 116, 862.325, 73/862.321, 862.324

[56] References Cited

U.S. PATENT DOCUMENTS

| | | | |
|---|---|---|---|
| 3,845,479 | 10/1974 | Fabry | 73/862.191 |
| 4,785,675 | 11/1988 | Takasu et al. | 73/862.325 |
| 4,788,956 | 12/1988 | Suzuki et al. | 73/116 X |
| 4,931,940 | 6/1990 | Ogawa et al. | 73/116 X |
| 4,941,105 | 7/1990 | Marangoni | 364/506 |
| 5,182,943 | 2/1993 | Fukui et al. | 73/116 |
| 5,218,860 | 6/1993 | Storar | 73/116 |

Primary Examiner—Richard E. Chilcot, Jr.
Assistant Examiner—Elizabeth L. Dougherty
Attorney, Agent, or Firm—Panitch Schwarze Jacobs & Nadel

[57] ABSTRACT

A system for determining shaft load parameters including shaft windup angle per unit length, torque output and power output in a generally cylindrical rotating shaft having an outer surface and a longitudinal axis extending through the center thereof includes a plurality of probes spaced apart from each other. Each probe has a first end and a second end, the first end of each probe being in facing relationship with the rotating shaft. A rigid frame commonly supports all of the probes at a predetermined distance from the outer surface of the shaft. The frame is supported in such a manner that the frame may vibrate or displace relative to the rotating shaft essentially as a rigid body. Targets on the outer surface of the rotating shaft are located for triggering a probe output response each time during shaft rotation that a target passes the first end of one of the probes. A calculator calculates the torque induced shaft windup angle of the rotating shaft based in part on the probe trigger times and the spacing of the probes.

28 Claims, 3 Drawing Sheets

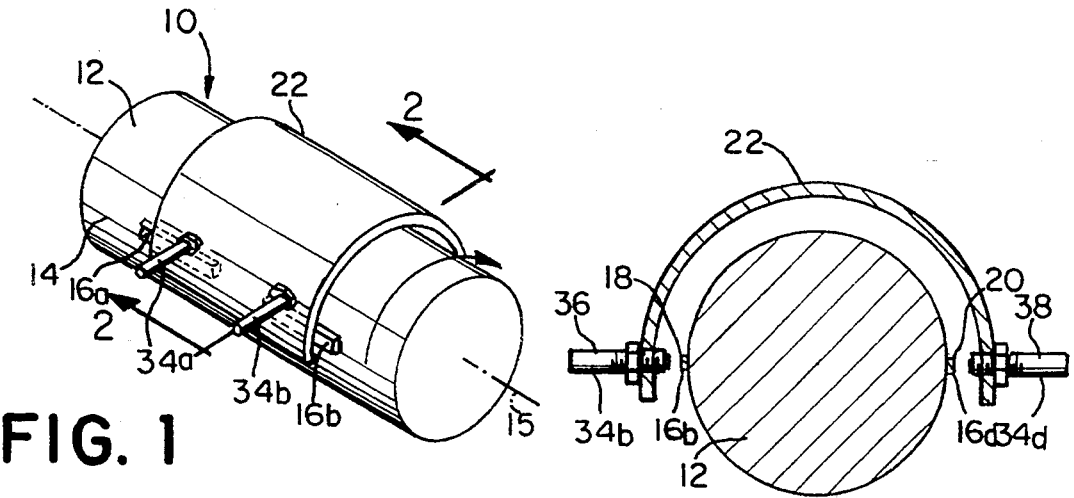
FIG. 1
FIG. 2
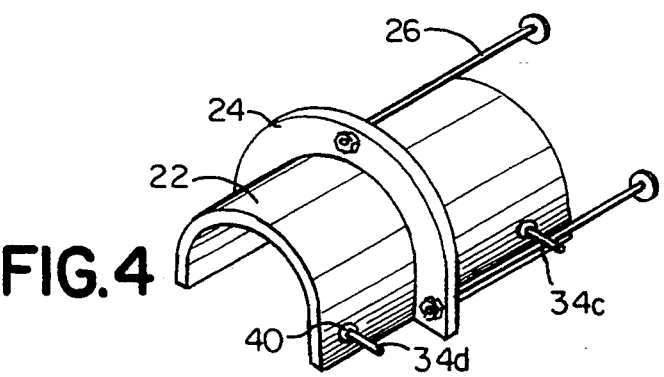
FIG. 4
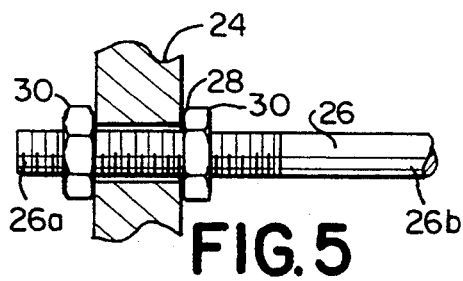
FIG. 5
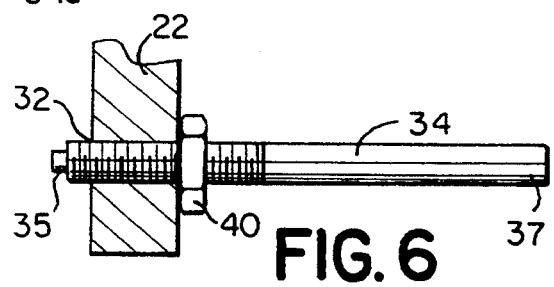
FIG. 6
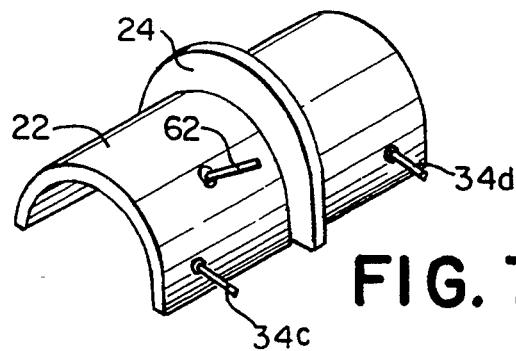
FIG. 7

SYSTEM FOR DETERMINING SHAFT LOAD PARAMETERS INCLUDING SHAFT WINDUP ANGLE PER UNIT LENGTH, TORQUE OUTPUT AND POWER OUTPUT IN A GENERALLY CYLINDRICAL ROTATING SHAFT

BACKGROUND OF THE INVENTION

The present invention relates to a system for determining shaft load parameters in a rotating shaft and, more particularly, to a system for non-contact determination of shaft windup angle per unit length, torque output and power output in a rotating shaft.

There are many prior art systems for detecting torque output and power output in a rotating shaft such as a shaft in a turbine or other such rotating equipment. Some prior art systems use axially spaced proximity probes which detect the passing of shaft keyways or targets which are placed on the shaft. However, with such prior art systems, the probe measurements may be inaccurate due to the effects of vibrations or position changes by either the shaft, the probes, or both which can affect target arrival times and produce an inaccurate shaft windup angle measurement.

One prior art torque measuring system described in U.S. Pat. No. 4,995,257 measures transient shaft torque using two separately mounted stationary probes to sense the passing of two targets or marks longitudinally spaced apart on a rotating shaft. The prior art system detects changes in the target passing times to discern transient shaft torques. For the system to yield accurate measurements, particularly for non-transient torques, the probes must be absolutely stationary with respect to the shaft. If the probes vibrate or displace relative to the shaft or to each other, then the resulting inaccuracies may significantly and adversely effect the torque measurements. Since it is almost impossible to maintain the probes absolutely stationary with respect to the shaft, the resulting measurements taken by the prior art system tend to be inaccurate.

Rotating shaft torque measurement is particularly useful in power generation facilities. Most generators are driven by a continuous train of several turbines. A continuous train of turbines comprises a plurality of turbines with in-line shafts each contributing torque, the sum of their torques driving the generator at a required speed. Sometimes, there is a condition of reduced torque in one of the various turbines in the turbine train due, for example, to labyrinth seal wear, blade erosion, steam chest valving problems, etc. A turbine having a lagging output torque must be compensated for by the other turbines in the train to keep the generator output constant. A lagging turbine effects the overall efficiency of the train, but may not be discernible because of the fact that the other turbines compensate for the lagging turbine. Proper shaft torque measurement permits the identification of a single turbine having a lagging output torque so that the problem can be noted and corrected before further deterioration of that turbine or the turbine train occurs.

The present invention is directed to a system for accurately and consistently determining shaft load parameters including shaft windup angle per unit length, torque output and power output in a rotating shaft. The shaft windup angle per unit shaft length is defined as the torque induced windup angle of the shaft over a given length of the shaft. The system preferably comprises four targets which are affixed to the rotating shaft and four probes which are commonly supported on a frame which can move and vibrate as a rigid body. The probes are fixedly positioned on the rigid frame around the shaft at spaced axial locations for sensing the passing of the targets as the shaft rotates. The probes being mounted on the rigid frame and the frame being supported so as to move essentially as a rigid body allows for an accurate shaft windup angle measurement to be obtained which is not effected by shaft or frame vibration and/or displacement. Accuracy and resolution are improved by averaging over multiple revolutions of the shaft. The windup angle resolution of the present invention approximates one millionth of a degree thereby making it possible to discern as little as a three foot-pound torque on a 10 inch diameter steel shaft with an axial probe spacing of only 3 inches. The present invention is also useful in determining the torque or power being supplied to a pump in a turbine driven pump application, and for measuring absolute and relative propeller shaft powers for multiscrew ships.

SUMMARY OF THE INVENTION

Briefly stated, the present invention is directed to a system and method for determining shaft load parameters including shaft windup angle per unit length, shaft torque and shaft power in a generally cylindrical rotating shaft having a cylindrical outer surface and a longitudinal axis extending through the center thereof. The system comprises a plurality of probes spaced from each other. Each probe has a first end and a second end. The first end of each probe is in facing relationship with the rotating shaft. A rigid frame commonly supports all of the probes at a predetermined distance from the outer surface of the shaft. The frame is supported in such a manner that the frame may vibrate or displace relative to the rotating shaft essentially as a rigid body. Target means on the outer surface of the rotating shaft are located for triggering a probe output response each time during shaft rotation that a target means passes the first end of one of the probes. Calculating means calculates one or more of the shaft load parameters based in part on the probe trigger times and the spacing of the probes.

BRIEF DESCRIPTION OF THE DRAWINGS

The foregoing summary, as well as the following detailed description, will be better understood when read in conjunction with the appended drawings. For the purpose of illustrating the invention, embodiments which are presently preferred are shown in the drawings. It is understood, however, that this invention is not limited to the precise arrangements and instrumentalities shown. In the drawings:

FIG. 1 is a perspective view of a portion of a system for determining shaft load parameters in a rotating shaft in accordance with the present invention;

FIG. 2 is a sectional view of a portion of the system taken along line 2—2 of FIG. 1;

FIG. 4 is an enlarged perspective view of the frame and probes of the system of FIG. 1;

FIG. 5 is an enlarged sectional view of a preferred fastening rod of the frame of FIG. 4;

FIG. 6 is an enlarged sectional view of a preferred probe contained within the frame of FIG. 4;

FIG. 7 is a perspective view of a frame including a non-contacting thermal probe.

DESCRIPTION OF PREFERRED EMBODIMENTS

Figure 3:
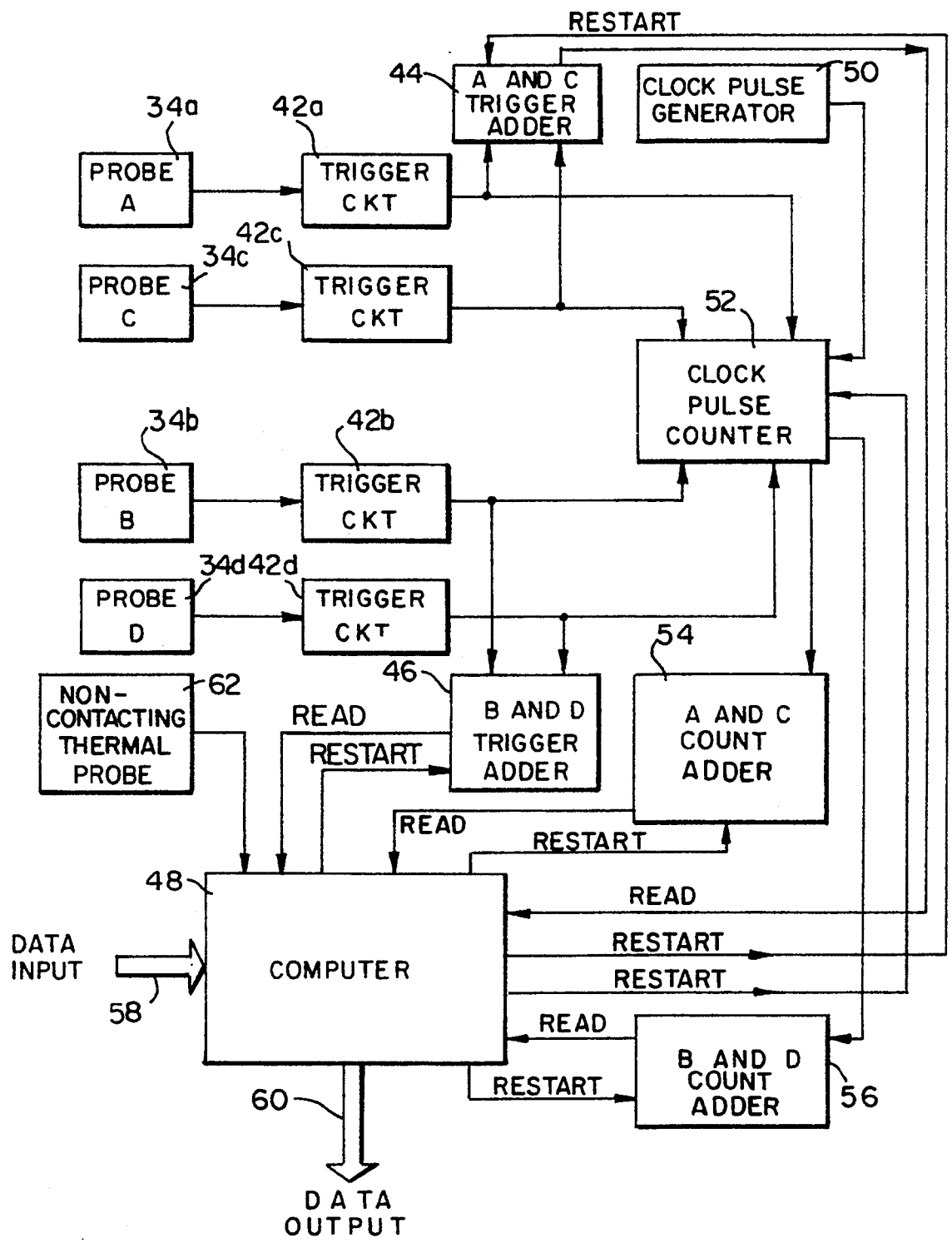
FIG. 3 is a functional schematic block diagram of a preferred embodiment of the circuitry of the system of FIG. 1.

Referring to the drawings, wherein like numerals indicate like elements throughout, there is shown in FIG. 1 a preferred embodiment of a system 10 for determining shaft load parameters including shaft windup angle per unit length, torque output and power output in a rotating shaft 12 in accordance with the present invention. It will be appreciated by those skilled in the art that other shaft load parameters may also be determined using the system 10. The shaft 12 is preferably generally cylindrically-shaped and is illustrated as being generally solid. However, it is to be understood by those skilled in the art that the shaft may be any other suitable shape or the shaft may be hollow without departing from the scope and spirit of the present invention. The shaft 12, a section of which is shown in FIG. 1, has a longitudinal axis 15 which extends generally through the center of the rotating shaft 12. When a torque is applied to the shaft 12, the shaft 12 is caused to deform, or windup in either a clockwise or a counter-clockwise direction depending upon the direction of the applied torque. The extent of the shaft windup angle is related to the shaft torque and thus the shaft power, both of which may be determined once the shaft windup angle has been established.

Located on a portion of an outer surface 14 of the shaft 12 are target means which in the present embodiment comprise a plurality of individual targets 16. The targets 16 are preferably permanently affixed to the shaft 12 at at least two spaced axial locations. The targets 16 rotate with the shaft 12 and are preferably made of a ferromagnetic material, such as steel, or of a highly electrically conductive material, such as aluminum. The targets 16 are typically secured to the shaft 12 by epoxy bonding, or some other such surface mounting means including brazing or welding. It should be understood by those skilled in the art that the targets may be made of other materials if desired and may be secured to the shaft in some other manner if desired.

In the preferred embodiment, the plurality of targets 16 comprise four individual targets 16a, 16b, 16c, 16d which are located on the outer surface 14 of the shaft 12. It will be appreciated by those skilled in the art that the number of targets employed may be other than four. The targets are arranged on the shaft 12 such that targets 16a and 16c are diametrically opposed to each other, i.e., circumferentially spaced by approximately 180°. Targets 16b and 16d are also diametrically opposed to each other or circumferentially spaced by approximately 180°. Targets 16a and 16c or targets 16b and 16d could be spaced a few degrees greater than or less than 180° without departing from the scope and spirit of the present invention. However, the degree of vibration and position change compensation is reduced as the circumferential spacing between the targets shifts away from 180°. Furthermore targets 16a and 16b are preferably aligned on a first axis which is parallel to the longitudinal axis 15 of the shaft 12 and targets 16c and 16d are preferably aligned on a second axis which is parallel to the longitudinal axis 15 of the shaft 12.

In the present embodiment, the four targets 16a, 16b, 16c, 16d are arranged such that a first pair of targets 18 defined by the targets 16a and 16c are located closer to a first end of the shaft 12 and a second pair of targets 20 defined by targets 16b and 16d are located closer to a second end of the shaft 12. The targets 16a, 16b, 16c, 16d within each pair of targets 18, 20 are circumferentially aligned, that is, the targets of each pair are at the same position around the outer circumference of the shaft 12. Thus, targets 16a and 16b and targets 16c and 16d are at spaced locations along the axial length of the shaft 12, and in the present embodiment are preferably about 3 to 6 inches apart. Each target 16 in the present embodiment is preferably about one inch long, about one half inch wide and about a tenth of an inch thick.

It is to be understood by those skilled in the art that a different number of targets 16 could be used without departing from the spirit and scope of the present invention. For example, two targets (not shown) extending in length to encompass a substantial portion of the outer surface 14 of the shaft 12 could be used and arranged such that the targets are diametrically opposed by about 180°. A pair of opposing extended axial slots such as keyway slots could also be used as targets 16. It is to be further understood by those skilled in the art, that the targets may be any suitable size and may be located relative to each other in a different manner on the shaft 12 without departing from the scope and spirit of the present invention.

A frame 22, which is preferably generally arcuate and in the present embodiment generally C-shaped in cross-section, surrounds at least a portion of the outer surface 14 of the shaft 12. The frame 22 is preferably made from a generally rigid material, such as, but not limited to steel. In the present embodiment, the inner surface of the frame 22 is separated from the shaft 12 by a predetermined distance, preferably approximately 1 inch. The frame 22 is capable of vibrating or changing position with respect to the shaft 12 but must do so as a rigid body. It is to be understood by those skilled in the art, that the frame 22 can be made of some other material or may be of some other shape and can be separated from the shaft 12 by any other suitable distance without departing from the scope and spirit of the present invention.

Referring to FIGS. 4 and 5, a flange or collar 24 is formed on the outer surface of the frame 22 to help rigidize the frame 22 and to hold the frame 22 in place with respect to the shaft 12. The collar 24 includes a plurality of support holes 28 (three in the present embodiment) for receiving a plurality of support rods 26 (three in the present embodiment) which are used to mount the frame 22 preferably to a fixed, non-rotating structure such as an adjacent bearing housing of a turbine, generator, pump etc. (not shown) with which the shaft 12 is associated. The collar 24 is preferably axially centrally located on the frame 22 but it could be at some other location. If desired, more than one collar may be formed on the frame 22, for example, a separate collar could be located on each axial end of the frame 22 (not shown). The holes 28 within the collar 24 are circumferentially spaced from one another in the present embodiment by approximately 90° but could be spaced in some other manner. The rods 26 secure the frame 22 in place with respect to the shaft 12. As shown in FIG. 5, a first end of each rod 26a is received by a support hole 28 within the collar 24 and is rigidly secured in place on the collar 24 by a pair of nuts 30, one nut on each side of the collar 24. A second end of each rod 26b is securely attached in the same manner or in some other manner to the fixed structure (not shown). The three point connection between the three rods 26 and the fixed structure provides a cantilever support arrangement which maintains the frame 22 in a relatively fixed position with respect to the shaft 12. If the frame 22 vibrates or is displaced with respect to the shaft 12, it does so as a rigid body.

A second set of holes 32 extend through the frame 22 and each receive and support one of a plurality of probes 34. The frame 22 commonly supports all of the probes 34 at a predetermined distance from the outer surface 14 of the shaft 12. The probes 34 are preferably proximity probes of a type well known in the art and are used to detect the passing of the leading edge of the targets 16 as the shaft 12 is rotating beneath the frame 22. In the preferred embodiment, four probes 34a, 34b, 34c, and 34d are securely mounted, one within each of the holes 32 extending through the frame 22. In the preferred embodiment, a first pair of probes 36 defined by probes 34a and 34c and a second pair of probes 38 defined by probes 34b and 34d are each preferably circumferentially spaced approximately 180° apart around the frame 22 and the probes 34a, 34b, 34c, and 34d of each pair 36 and 38 are generally circumferentially aligned with each other. Preferably probe 34a of the first pair 36 is axially aligned with probe 34b of the second pair 38 and probe 34c of the first pair 36 is axially aligned with probe 34d of the second pair 38. The probes 34a, 34b, 34c, 34d are further arranged such that probes 34a and 34c (the first pair of probes 36) can sense the passing of the leading edges of targets 16a and 16c (the first pair of targets 18) and probes 34b and 34d (the second pair of probes 38) can sense the passing of the leading edges of targets 16b and 16d (the second pair of targets 20) as the shaft 12 rotates. However, it is to be understood by those skilled in the art that different numbers or types of probes could be used and the probes could be positioned in a different manner with respect to each other without departing from the spirit and scope of the present invention.

Each probe 34a, 34b, 34c, and 34d has a first end 35 and a second end 37. The first end 35 of each probe 34a, 34b, 34c, 34d is received within one of the holes 32 within the frame 22 so that it is in facing relationship with the rotating shaft 12. Each probe 34a, 34b, 34c, 34d is also preferably generally perpendicular to the longitudinal axis 15 extending through the center of the rotating shaft 12. The probes 34a, 34b, 34c, 34d are securely mounted within the frame 22 such that the probes 34a, 34b, 34c, 34d are generally stationary with respect to the frame 22 and the particular alignment and spacial relationships established between the probes 34a, 34b, 34c, 34d as a group are maintained constant without regard to displacement or vibration of the shaft 12 or the frame 22. The rigidity of the frame 22 and the methodology described herein allow the frame 22 to vibrate or displace relative to the shaft 12 as a rigid body without affecting the accuracy of the shaft windup angle and other shaft parameters as determined from the probe output responses.

Because the probes 34a, 34b, 34c and 34d are all commonly mounted to the frame 22, when the frame 22 vibrates or is displaced relative to the shaft 12, the probes 34a, 34b, 34c, 34d are not independently displaced or vibrated. As shown in FIG. 6, each probe 34 is maintained within the frame 22 by complementary threading on each probe 34 and within the holes 32 and by a suitable locking nut 40 which is tightened around the radial outer surface of the threaded portion of each probe 34. It will be appreciated by those skilled in the art that the probes 34 may be secured to the frame 22 in some other manner, if desired.

Referring to FIG. 3, a clock pulse generator 50 generates clock pulses at a fixed rate. The clock pulse generator 50 in the present embodiment has a clock rate of preferably 20 million pulses per second and transmits the clock pulses to a clock pulse counter 52. The clock pulse counter 52 is preferably a 32 bit counter and is capable of accumulating up to 4,294,967,296 counts. As a result, for most shaft rotating speeds, the clock pulse counter 52 does not have to be restarted after every shaft revolution. For example, for a shaft 12 which is rotating at 3600 rpm, the clock pulse counter 52 can accumulate up to 13,000 shaft revolutions before restarting. The clock pulse counter 52 allows for an accurate reading to be obtained for determining when a target 16 passes one of the probes 34 without requiring constant resetting of the counter 52.

The second end of each probe 37 is preferably connected by a suitable wire or cable (not shown) to a corresponding trigger circuit 42a–42d. When any of the four probes, 34a, 34b, 34c, 34d is passed by the leading edge of one of the targets 16, the associated rapid rise in the probe output causes the corresponding trigger circuit 42a–42d to activate or trigger and generate an output or trigger pulse.

As the leading edge of either target 16a or 16c passes by either probe 34a or probe 34c, the corresponding trigger circuit 42a or 42c transmits a trigger pulse to an A and C trigger adder 44 which accumulates the sum of the received trigger pulses from the trigger circuits 42a and 42c. Each pulse that one of the trigger circuits 42a or 43c transmits to the A and C trigger adder 44 also gets transmitted to the clock pulse counter 52 causing the clock pulse counter 52 to read the clock pulse count at that instant and transfer the clock pulse count to an A and C count adder 54 which accumulates the sum of the clock pulse counts read at the time of all outputs of trigger circuits 42a and 42c.

Similarly, as the leading edge of either target 16b or 16d passes by either probe 34b or 34d, the corresponding trigger circuit 42b or 42d transmits a trigger pulse to a B and D trigger adder 46 which accumulates the sum of the received trigger pulses from the trigger circuits 42b and 42d. Each trigger pulse that one of the trigger circuits 42b and 42d transmits to the B and D trigger adder 46 is also transmitted to the clock pulse counter 52 causing the clock pulse counter 52 to read the clock pulse count at that instant and transfer the clock pulse count to a B and D count adder 56 which accumulates the sum of the clock counts read at the time of all outputs of the trigger circuits 42b or 42d.

The computer 48 receives data from the A and C trigger adder 44, from the B and D trigger adder 46, from the A and C count adder 54, and from the B and D count adder 56. After a predetermined number of shaft revolutions, the computer 48 restarts or clears the clock pulse counter 52. Once the clock pulse counter 52 is restarted, preferably a group of four triggerings occurs in rapid succession followed by another group of four triggerings a half revolution later. To ensure that the first group of triggerings does not contain less than four triggerings, the system discards the first group of triggerings and begins with the second group of triggerings by waiting until 0.3 of a revolution after the first group of triggerings has occurred following the restart of the clock pulse counter 52.

The computer 48 is preferably a personal computer such as, but not limited to, an IBM or an IBM compatible computer. It is to be understood by those skilled in the art that any type of computer may be used, such as a mainframe or computer network or other processing unit without departing from the scope and spirit of the present invention. The computer 48 stores the data received from the above-described adder/circuits associated with probes 34a, 34b, 34c, 34d along with other necessary data for calculating the shaft windup angle per unit length, shaft torque, power, shaft speed and other shaft load parameters as will be described in detail hereinafter.

The computer 48 receives additional input data 58 which is typically in the form of constants and other data which relate specifically to the shaft 12 and the probes 34a, 34b, 34c, 34d. The additional data input 58 can include, but is not limited to, the modulus of rigidity of the shaft, the shaft cross-sectional geometry between the probes and the axial probe spacing. The calculations performed by the computer 48 include determining the shaft windup angle per unit length, the shaft torque output, the shaft power output and the in-line turbine power which are transmitted from the computer 48 as data output 60 and will be discussed in detail hereinafter.

The computer 48 receives the number of clock pulse counts from the A and C count adder 54 and the B and D count adder 56, either in continuous running fashion or at the end of each averaging cycle. The computer also receives the total pulse counts from both the A and C count adder 54 and the B and D count adder 56 either in continuous running fashion or at the end of each averaging cycle.

When shaft windup angle per unit length, torque output or power output are to be determined for the rotating shaft 12, zero torque readings are initially determined to obtain a zero torque initial average windup count. Readings are taken in two groups of four as the targets pass the four probes, 34a, 34b, 34c, 34d, for an initial revolution and the angles at which each probe 34 is triggered by a target 16a, 16b, 16c, 16d is recorded and stored within the memory of the computer 48. To understand the operation of the system 10, it is useful to view the readings at each passing of the leading edge of a target 16 by a probe 34 as a shaft angle measurement rather than as a pulse count difference. Later, it will be shown how these are equivalent. For example, if readings were taken for a full revolution of the shaft 12, the following shaft angle readings could result:

|     | Group I Triggerings |     |     |
| --- | --- | --- | --- |
| AA  | BB  | CC  | DD  |
| 0   | 0   | 1   | 1   |
|     | R1  |     | R2  |
|     | 0   |     | 0   |
|     | Group II Triggerings |     |     |
| AC  | BD  | CA  | DB  |
| 180 | 180 | 181 | 181 |
|     | R3  |     | R4  |
|     | 0   |     | 0   |

The above readings indicate the angle of rotation of the shaft 12 when each of the probes detects one of the targets. The first letter in each column (A, B, C, D) identifies the probe 34 and the second letter (A, B, C, D) identifies the target 16. For example, AC indicates when probe 34a detects target 16c.

If the difference between the BB and AA data is taken and the difference between the DD and CC data is taken for the Group I triggerings, the initial results for each difference is zero as indicated by R1 and R2. Likewise, if the difference between the BD and AC data and the difference between the DB and CA data for the Group II triggerings are taken, the results are also zero as indicated by R3 and R4. Assuming that this is a reading taken at zero torque, the algebraic sum of the differences obtained for each group, (i.e., the sum of R1, R2, R3 and R4) divided by four represents the initial condition for zero torque, i.e., zero shaft windup angle ($W_0=0$). However, it is to be understood by those skilled in the art that the angle difference or the sum of the angle differences are not necessarily equal to zero. In actuality, many such rotations are typically averaged together to obtain the average shaft windup angle for zero torque.

Once the zero torque average shaft windup angle is obtained, additional readings can be obtained with applied torque during additional revolutions of the shaft 12. These additional readings are compared to the initial readings at zero torque to detect torque induced shaft windup angle per unit length within the shaft 12 as will be described in detail hereinafter. Preferably the zero torque initial average windup count is subtracted from the subsequent average windup count to get the average windup count due to torque. The following will illustrate how the shaft windup count is detected. Typically, as with zero torque previously applied, a torque is applied to the shaft 12 for a predetermined period of time as the shaft 12 is rotating. If shaft angle readings are taken for one of the revolutions of the shaft when a torque is applied which causes a plus and minus 1 degree change in the triggering angles, the following readings may be obtained.

|     | Group I Triggerings |     |     |
| --- | --- | --- | --- |
| AA  | BB  | CC  | DD  |
| 1   | −1  | 2   | 0   |
|     | R1  |     | R2  |
|     | −2  |     | −2  |
|     | Group II Triggerings |     |     |
| AC  | BD  | CA  | DB  |
| 181 | 179 | 182 | 180 |
|     | R3  |     | R4  |
|     | −2  |     | −2  |

The above readings show that there is a change in the angle differences resulting from the application of torque to the shaft 12. If the difference between BB and AA, and DD and CC are taken for the Group I triggerings, both algebraic sums equal −2 as indicated by R1 and R2. Likewise, if the algebraic sum for the Group II triggerings are taken, i.e., the difference between BD and AC and the difference between DB and CA, the algebraic sums are also −2 as indicated by R3 and R4. Next, the sum of the angle differences is taken, i.e., the sum of R1, R2, R3 and R4, which equals a total of −8 degrees. If the sum of the angle differences is divided by four, the shaft windup angle can be obtained, which is −2 degrees. The shaft windup angle represents the shaft windup angle over the axial distance separating probes 34a and 34c from probes 34b and 34d.

Another way to obtain the shaft windup angle is by adding the angles indicated by the B and D probe triggerings, subtracting the angles indicated by the A and C probe triggerings and dividing the sum by four to get the average. If such a course is taken, then the total sum of the angles indicated by the B and D triggerings is as follows:

$$BB + DD + BD + DB = BD_{(sum)}$$
$$-1 + 0 + 179 + 180 = 358 \quad (1)$$

where $BD_{(sum)}$ = sum of the angles indicated by the triggerings of both probes 34b and 34d.

The sum of the angles indicated by the A and C probe triggerings equals the following:

$$AA + CC + AC + CA = AC_{(sum)}$$
$$1 + 2 + 181 + 182 = 366 \quad (2)$$

where $AC_{(sum)}$ = sum of the angles indicated by the triggerings of both probes 34a and 34c.

If the difference between the sum of the A and C probe triggering angles and the sum of the B and D probe triggering angles is calculated, the following is obtained:

$$BD_{(sum)} - AC_{(sum)} = X_D$$
$$358 - 366 = -8 \quad (3)$$

where $X_D$ = summed angle difference.

By dividing the summed angle difference by four the shaft windup angle is obtained and, hence, the shaft windup angle is indicated as follows:

$$\frac{X_D}{4} = W_1 \quad (4)$$

$$\frac{-8}{4} = -2$$

where $W_1$ = shaft windup angle.

In the preferred embodiment, the shaft windup angle determined for probes 34a, 34b, 34c and 34d are initially calculated at zero torque to obtain a zero torque initial windup angle as discussed above. Once the measurements for zero torque have been calculated, the zero torque initial windup angle is subtracted from subsequent shaft windup angles with torque applied to get the shaft windup angle due to torque. For example, using the above calculations, the shaft windup angle due to torque based on the two readings above would be as follows:

$$W_1 - W_0 = W_A$$
$$-2 - 0 = -2 \quad (5)$$

where
$W_1$ = subsequent shaft windup angle
$W_0$ = zero torque initial shaft windup angle
$W_A$ = shaft windup angle due to torque.

Therefore, for the above case, the shaft windup angle due to torque from one revolution at zero torque and one revolution at torque is $-2°$.

The shaft windup count due to torque can be used to obtain the average shaft windup angle due to torque by the following equation:

$$W_A = W_c \times \frac{\bar{S}}{R} \times 360° \quad (6)$$

where
$W_A$ = shaft windup angle due to torque (degrees)
$W_c$ = shaft windup count due to torque (counts)
$\bar{S}$ = average shaft speed (rev/sec)
$R$ = clock pulse rate (count/sec).

$W_A$ is the sum of the counts at the four B and D probe triggerings, minus the sum of the counts at the four A and C probe triggerings, all divided by four, at torque minus all the same at zero torque.

The multiple measurements in each revolution are for the purpose of eliminating errors that result from position changes or vibrations of either the shaft 12 or the probe holding frame 22. Position changes and synchronous vibrations are corrected for in each rotation, as are most non-synchronous vibrations.

Multiple rotations are taken into account by averaging, that is by subtracting the A and C count adder 54 value from the B and D count adder 56 value and then dividing this result by either the value of the A and C trigger adder 44 or the value of the B and D trigger adder 46. These two latter values should be identical and equal to four times the number of revolutions. This calculation is performed both at torque and at zero torque, the difference yielding the average shaft windup count due to torque, $\overline{W}_A$.

Averaging over multiple rotations improves inaccuracies caused by random probe noise. The improvement is proportional to the square root of the number of averages. Averaging over multiple rotations also improves the resolution beyond one count. The improvement in resolution is directly proportional to the number of averages. For example, averaging 8,000 triggerings (1,000 revolutions) yields approximately 1/8000 of a count resolution. At approximately 20,000,000 counts per second and 60 revolutions per second at 3600 RPM, the resolution yielded is nearly one ten millionth of a degree. The improved resolution is assured if the number of counts per revolution is not an integer number as is the case with an independent clock. If the levels of non-synchronous vibration exceed one count worth for the diameter and speed of the shaft, resolution improvement due to averaging is almost always assured. As indicated previously, to calculate the average shaft windup angle due to torque $\overline{W}_A$ from the average shaft windup count due to torque $\overline{W}_c$, it is necessary to know the average shaft speed $\bar{S}$.

To obtain the average shaft speed $\bar{S}$, the following equation can be used:

$$\bar{S} = \frac{R \, (AC_{trigs})}{2 \, (AC_n - AC_o)} \quad (7)$$

where
$\bar{S}$ = average shaft speed (rev/sec)
$R$ = clock pulse rate (counts/sec)
$AC_{trigs}$ = total number of triggerings by probes 34a and 34c from initial count sum to last count sum (inclusive)
$AC_n$ = last count sum of probes 34a and 34c triggerings
$AC_o$ = initial count sum of probes 34a and 34c triggerings.

In determining the average shaft speed, it is important that full revolutions be used since half revolutions may not be accurate due to the targets 16 not being spaced exactly 180° apart. The shaft speed can be measured in terms of radians per second by multiplying the shaft speed in revolutions per second by $2\pi$.

The average shaft windup angle $\overline{W}_A$ can be converted to average shaft torque $\overline{T}$ by the following equation:

$$\overline{T} = \frac{\overline{W}_A}{y} \times J \times G \tag{8}$$

where
$\overline{T}$ = average shaft torque
$\overline{W}$ = average shaft windup angle
y = axial distance between probes
J = polar moment of inertia of the shaft cross section beneath the probes
G = modulus of rigidity of the shaft.

It is important to note that the modulus of rigidity may vary with temperature to the effect that for most steels it decreases by about 2% for every increase in shaft temperature of 100° F. A non-contacting thermal probe 62 (FIGS. 3 and 7), can be attached to the frame 22 for sensing the surface temperature of the shaft 12. The readings from the temperature probe 62 can be used by the computer 48 to provide a temperature correction to the modulus of rigidity. The surface temperature measurement is sufficient since the effective modulus of rigidity is dominated by the modulus of rigidity of the outer surface of the shaft 12.

To calculate average shaft power $\overline{P}$, the following equation can be used:

$$\overline{P} = \overline{T} \times \overline{S} \times 2\pi \tag{9}$$

where
$\overline{P}$ = average power (ft. lb./sec.)
$\overline{T}$ = average shaft torque (ft. lb.)
$\overline{S}$ = average shaft speed (rev./sec.).

The resulting power measurement is in foot/pounds per second. To obtain the power in units of horsepower, the result is divided by 550. To obtain the power in kilowatts, the result is divided by 738.

The present system is designed to provide accurate results even if displacement of the probes 34 or shaft 12 occur during the measurements so long as all the probes 34 are mounted on a common rigid frame 22 and thus their relative spacing remains the same. For example, if the frame 22 is shifted up at the end containing probes 34a and 34c resulting in a one degree measurement error, all the triggerings for probe 34a would occur one degree late, while all the triggerings for probes 34c would occur one degree early. The net result is that the value in the A and C count adder 54 is unaffected, and thus so is the final result. Even if a torque is applied under these conditions, the value in the A and C count adder 54 is unaffected by the shifted condition of the frame, and thus it does not cause erroneous angle, torque or power results. It is to be understood by those skilled in the art that the frame may be vertically displaced at either end, shifted up or down any small distance or pitched or rolled at any small angle, and still not cause erroneous results because of the unique methodology of combining readings in the present invention.

The frame 22 may also be axially shifted such that probes 34a and 34b and probes 34c and 34d are axially displaced by some distance. If the leading edges of the first pair of targets 18 are parallel and the leading edges of the second pair of targets 20 are parallel, then by virtue of the unique combining methodology above, there is typically no angle torque or power misindication caused by the effect of an axial frame displacement not cancelling out.

The frame 22 may also be horizontally displaced which would have an impact on the triggering angles. If there is an increase in the target to probe gap, the triggering time is slightly delayed. If there is a decrease in the target-to-probe gap, the triggering time is slightly increased. As long as the triggering time is a linear function of the gap, then by virtue of the unique combining methodology above, there is little or no effect caused by small horizontal frame translations or small angle frame yawing and no angle, torque or power misindications result.

Frame vibrations may also be encountered while the shaft angle, torque, and/or power is being determined. The most typical and dominant type of frame vibrations are synchronous vibrations at shaft rotational frequency or at integer multiples of the shaft rotational frequency. The frame vibrations may be vertical, horizontal, axial, yaw, roll or pitch vibrations. Because synchronous vibrations repeat exactly in every revolution, their effect is the same as a positional change which as has been already discussed, causes no angle, torque, or power misindications. The typically much smaller non-synchronous vibrations may not even require multiple revolutions for their effect to be averaged away because with opposing targets and probes, they cancel in each group of triggerings. Thus, they also result in virtually no error in angle, torque or power determination.

Shaft positional changes and vibrations are similar to the effects of frame positional changes and vibrations and produce similar effects. By virtue of the unique methodology of combining readings in the present invention, they also do not cause any erroneous results in the angle, torque or power calculations.

Another potentially deleterious situation that must be considered is one where the probes 34 or the targets 16 are not exactly positioned opposite one another. If the probes 34 or the targets 16 are not perfectly positioned, a non zero result may be obtained for the shaft windup angle measurement at zero torque. If the degree of non perfection is on the order of 10° or less, little or no error results when the shaft windup angle at zero torque is subtracted from the shaft windup angle at torque to obtain the shaft windup angle due to torque. Likewise, little or no error results in the torque and power determinations which are computed from the shaft windup angle due to torque.

Figure 8:
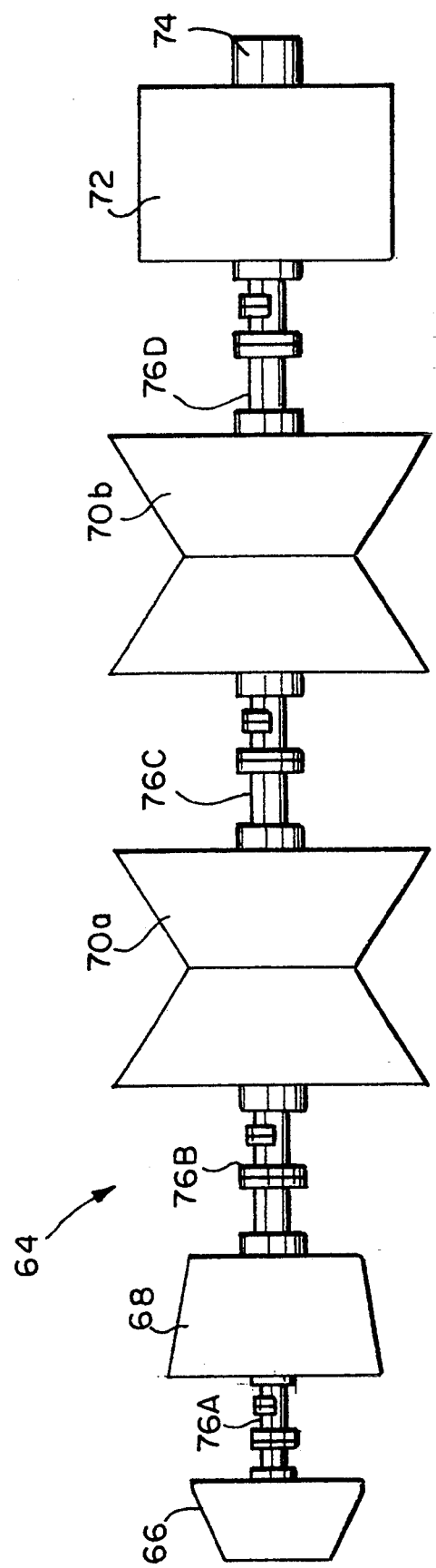
FIG. 8 is a schematic plan view of a train of turbines in which the system of FIG. 1 may be used.

Referring to FIG. 8, there is shown a typical power-generating turbine generator train 64. It is to be understood by those skilled in the art that the turbine train 64 is merely exemplary and that the system of the present invention can be used with any rotating shaft or any other turbine train without departing from the spirit and scope of the present invention. The turbine train 64 comprises a high pressure turbine 66, an intermediate pressure turbine 68, and two low pressure turbines 70a, 70b. The turbine train 64 is connected to a generator 72 and exciter 74. In the preferred embodiment, the low pressure turbines 70a, 70b are typically condensing turbines and are therefore not amenable to a thermodynamic enthalpy drop test for determining efficiency or power. Therefore, if a low pressure turbine loses efficiency from causes such as labyrinth seal wear, blade erosion or a steam chest valving problem, the other turbines would be forced to compensate for the lagging turbine and the problem with the low pressure turbine could continue undetected. In order to monitor a turbine train such as shown in FIG. 8, the system 10 of the present invention could be placed at appropriate shaft locations as indicated by reference 76a, 76b, 76c, 76d. Each monitoring location would preferably contain four probes 34 and four targets 16 as described above.

A problem turbine is identified by first measuring the windup angles per unit length at shaft locations 76a, 76b, 76c, 76d which are located between each turbine and by then calculating and comparing the associated shaft torques or powers. The torque or power output of each turbine is determined by computing the difference between the torque or power values obtained at opposite ends of that turbine.

For example, the torque or power measured at shaft location 76a which is located between the high pressure turbine 66 and the intermediate pressure turbine 68 is the torque or power being supplied by the high pressure turbine 66 since there is no power carrying shaft at the other end of that turbine. The torque or power measured at shaft location 76b between the intermediate turbine 68 and the first low pressure turbine 76 less the torque or power at shaft location 76a is the torque or power output of the intermediate pressure turbine 68. Likewise, to obtain the torque or power output of the first low pressure turbine 70a, the difference between the torques or power outputs at locations 76b and 76c is calculated. Finally, to obtain the torque or power output of the second low pressure turbine 70b, the difference between the torques or power outputs at shaft locations 76c and 76d is calculated.

The power as measured at 76d is the total power being supplied by all the turbines in the train 64. Therefore, the power of the first low pressure turbine 70a divided by the total power times 100 is the percent power contribution of the first low pressure turbine 70a. A similar relationship exists for the second low pressure turbine 70b, and for all the other turbines 66, 68 in the train 64. The two low pressure turbines, or three low pressure turbines if there are three, have a more special relationship than any of the other turbines because they typically have identical shaft diameters, shaft materials, and shaft temperatures, and this includes the shaft carrying the total power. Thus, the percent contribution of each low pressure turbine can be computed very accurately, possibly to better than 0.2 percent, without having to know the absolute outside and inside diameters, the absolute modulus of rigidity, or the absolute shaft temperature.

From the foregoing description it can be seen that the present invention comprises a system for determining shaft load parameters including torque induced shaft windup angle per unit length in a generally cylindrical rotating shaft and associated shaft torque, shaft power, and shaft speed. The use of multiple measurements corrects for errors that would otherwise be introduced by position changes of the probes or shaft, or by vibrations of the probes or the shaft. The use of multiple measurement locations along a machine train allows for separating out the torques or powers used or supplied by individual machines arranged in that train. It will be appreciated by those skilled in the art that changes may be made to the above-described embodiment of the invention without departing from the broad inventive concept thereof. It is understood, therefore, that this invention is not limited to the particular embodiment disclosed, but is intended to cover all modifications which are within the scope and spirit of the invention as defined by the appended claims.

We claim:

1. A system for determining a shaft torsional load parameter in a generally cylindrical torque carrying, rotating shaft having a cylindrical outer surface and a longitudinal axis extending through the center thereof, the rotating shaft possibly vibrating and displacing, the system comprising:

a plurality of probes spaced from each other, with at least two probes spaced from each other in the shaft axial direction, each probe having a first end and second end, the first end of each probe being in facing relationship with the outer surface of the rotating shaft;

a rigid frame commonly supporting all of the probes at a predetermined distance from the outer surface of the shaft, the frame being supported in such a manner that the frame may vibrate and displace relative to the rotating shaft essentially as a rigid body, the frame supporting the plurality of probes at positions to overcome inaccuracies caused by frame vibration and displacement and shaft vibration and displacement;

target means on the outer surface of the rotating shaft and located for triggering a probe output response each time during shaft rotation that a target means passes the first end of one of the probes, the target means located so as to overcome inaccuracies caused by frame vibration and displacement and shaft vibration and displacement; and calculating means for calculating the shaft torsional load parameter based in part on the probe trigger times and the spacing of the probes and at the same time overcoming inaccuracies caused by frame vibration and displacement and shaft vibration and displacement.

2. A system according to claim 1, wherein the number of probes is four.

3. A system according to claim 2, wherein the four probes are arranged such that a first pair of probes are located on a first side of the frame and a second pair of probes are located on a second side of the frame, the first pair of probes being aligned with each other and the second pair of probes being aligned with each other.

4. A system according to claim 3, wherein the first pair of probes and the second pair of probes are spaced 180° apart around the rotating shaft.

5. A system according to claim 4, wherein each target is made from a ferromagnetic material.

6. A system according to claim 4, wherein each target is made from a conductive material.

7. A system according to claim 1, wherein said target means comprises at least a pair of targets which are circumferentially spaced and generally axially aligned with each other.

8. A system according to claim 7, wherein the targets are circumferentially spaced by 180°.

9. A system according to claim 8 wherein the targets are two extended axial slots.

10. A system according to claim 1 further comprising:

counting means for counting the number of times a target means passes by at least one of the probes; and timing means for measuring a time at which a target means passes by at least one of the probes.

11. A system according to claim 10, wherein timing means includes a clock pulse generator which generates clock pulses at a predetermined rate which is substantially greater than the speed of rotation of the shaft and which is used to measure the time at which a target means passes one of the probes.

12. A system according to claim 11, wherein the predetermined rate of the clock pulse generator is not an integer multiple of the shaft rotational speed.

13. A system according to claim 1, wherein said frame is arcuate and complementary to at least a portion of the outer surface of the rotating shaft.

14. A system according to claim 1, further comprising means for determining constants relating to the shaft for measuring shaft torque.

15. A system according to claim 14, where the constants include material properties of the shaft.

16. A system according to claim 14, wherein said constants include a modulus of rigidity for the shaft.

17. A system according to claim 1, further comprising a noncontacting thermal probe for measuring surface temperature of the shaft proximate the target means.

18. A system according to claim 1 further comprising averaging means for averaging the number of times a target means passes one of the probes over multiple shaft revolutions.

19. A system according to claim 1 wherein the shaft load parameter is shaft torsional windup angle per unit length.

20. A system according to claim 1 wherein the shaft torsional load parameter is shaft torque.

21. A system according to claim 1 wherein the shaft torsional load parameter is shaft power output.

22. A system for measuring shaft windup angle per unit length in a bearing mounted, generally cylindrical, torque carrying, rotating shaft having an outer surface and a longitudinal axis extending through the center thereof, the rotating shaft possibly vibrating and displacing relative to its bearings and relative to inertial space, the system comprising:

at least four probes spaced from each other, each probe having a first end and a second end, a first pair of probes being positioned on a first side of the rotating shaft spaced from each other in the shaft axial direction, and a second pair of probes being positioned on a second side of the rotating shaft, generally opposite the first pair and similarly axially spaced from each other, the first end of each probe being in facing relationship with the outer surface of the rotating shaft;

a rigid frame commonly supporting all of the probes at a predetermined distance from the outer surface of the rotating shaft, the frame being supported in such a manner that the frame may vibrate and displace relative to the rotating shaft essentially as a rigid body;

at least two pairs of aligned targets located on the outer surface of the rotating shaft, a first pair of targets being positioned on the rotating shaft spaced from each other in the shaft axial direction, and a second pair of targets being positioned on the rotating shaft, radially spaced from the first pair of targets and similarly axially spaced from each other, so that each probe detects the passage of two targets each revolution of the shaft for triggering a probe output response from each probe twice each shaft revolution;

counting means for counting the number of probe output responses over multiple revolutions of the shaft;

timing means for measuring a time for every probe output response over multiple revolutions of the shaft; and calculating means for calculating the shaft windup angle of the rotating shaft based in part on the probe trigger times and the spacing of the probes, independent of the effects of any frame vibration and displacement and any shaft vibration and displacement.

23. A system for measuring shaft torque in a bearing mounted, generally cylindrical, torque carrying, rotating shaft having an outer surface and a longitudinal axis extending through the center thereof, the rotating shaft possibly vibrating and displacing relative to its bearings and relative to inertial space, the system comprising:

at least four probes spaced from each other, each probe having a first end and a second end, a first pair of probes being positioned on a first side of the rotating shaft spaced from each other in the shaft axial direction, and a second pair of probes being positioned on a second side of the rotating shaft, generally opposite the first pair and similarly axially spaced from each other, the first end of each probe being in facing relationship with the outer surface of the rotating shaft;

a rigid frame commonly supporting all of the probes at a predetermined distance from the outer surface of the rotating shaft, the frame being supported in such a manner that the frame may vibrate and displace relative to the rotating shaft essentially as a rigid body;

at least two pairs of aligned targets located on the outer surface of the rotating shaft, a first pair of targets being positioned on the rotating shaft spaced from each other in the shaft axial direction, and a second pair of targets being positioned on the rotating shaft, radially spaced from the first pair of targets and similarly axially spaced from each other, so that each probe detects the passage of two targets each revolution of the shaft for triggering a probe output response from each probe twice each shaft revolution;

counting means for counting the number of probe output responses over multiple revolutions of the shaft;

timing means for measuring a time for every probe output response over multiple revolutions of the shaft; and calculating means for calculating the shaft windup angle of the rotating shaft based in part on the probe trigger times and the spacing of the probes, independent of the effects of any frame vibration and displacement and any shaft vibration and displacement.

24. A system for measuring shaft power output in a bearing mounted, generally cylindrical, torque carrying, rotating shaft having an outer surface and a longitudinal axis extending through the center thereof, the rotating shaft possibly vibrating and displacing relative to its bearings and relative to inertial space, the system comprising:

at least four probes spaced from each other, each probe having a first end and a second end, a first pair of probes being positioned on a first side of the rotating shaft spaced from each other in the shaft axial direction, and a second pair of probes being positioned on a second side of the rotating shaft, generally opposite the first pair and similarly axially spaced from each other, the first end of each probe being in facing relationship with the outer surface of the rotating shaft;

a rigid frame commonly supporting all of the probes at a predetermined distance from the outer surface of the rotating shaft, the frame being supported in such a manner that the frame may vibrate and displace relative to the rotating shaft essentially as a rigid body;

at least two pairs of aligned targets located on the outer surface of the rotating shaft, a first pair of targets being positioned on the rotating shaft spaced from each other in the shaft axial direction, and a second pair of targets being positioned on the rotating shaft, radially spaced from the first pair of targets and similarly axially spaced from each other, so that each probe detects the passage of two targets each revolution of the shaft for triggering a probe output response from each probe twice each shaft revolution;

counting means for counting the number of probe output responses over multiple revolutions of the shaft;

timing means for measuring a time for every probe output response over multiple revolutions of the shaft; and calculating means for calculating the shaft windup angle of the rotating shaft based in part on the probe trigger times and the spacing of the probes, independent of the effects of any frame vibration and displacement and any shaft vibration and displacement.

25. A method for determining a shaft torsional load parameter in a bearing mounted, generally cylindrical, torque carrying, rotating shaft having a radial outer surface and longitudinal axis extending through the center thereof, the rotating shaft possibly vibrating and displacing relative to its bearings and relative to inertial space, the method comprising the steps of:

providing a plurality of probes spaced from each other, with at least two of the probes spaced from each other in the shaft axial direction, each probe having a first end and a second end, the first end of each probe being in facing relationship with the radial outer surface of the rotating shaft;

providing a frame for rigidly supporting each probe at a predetermined distance from the outer surface of the rotating shaft, the frame being supported in such a manner that the frame may vibrate and displace relative to the rotating shaft essentially as a rigid body;

mounting each probe within the frame;

placing at least two pairs of targets on the radial outer surface of the rotating shaft such that at least two targets pass beneath each probe each revolution of the shaft for triggering a probe output response from each probe twice each shaft revolution;

establishing a zero torque angle of rotation which corresponds to the location of one of the targets;

rotating the shaft;

triggering a probe output response when a target passes the first end of one of the probes;

counting the number of times each probe is triggered by one of the targets; and calculating the shaft load parameter of the rotating shaft based in part on the probe trigger times, and the spacing of the probes and at the same time overcoming effects caused by frame vibration and displacement and shaft vibration and displacement.

26. The method as set forth in claim 25 wherein the shaft torsional load parameter is torque induced shaft windup angle per unit length.

27. The method as set forth in claim 26 further comprising the step of calculating the shaft torque based upon the shaft windup angle per unit length.

28. The method as set forth in claim 26 further comprising the step of calculating shaft power output based upon the shaft windup angle per unit length.

* * * * *